UNITED STATES PATENT OFFICE.

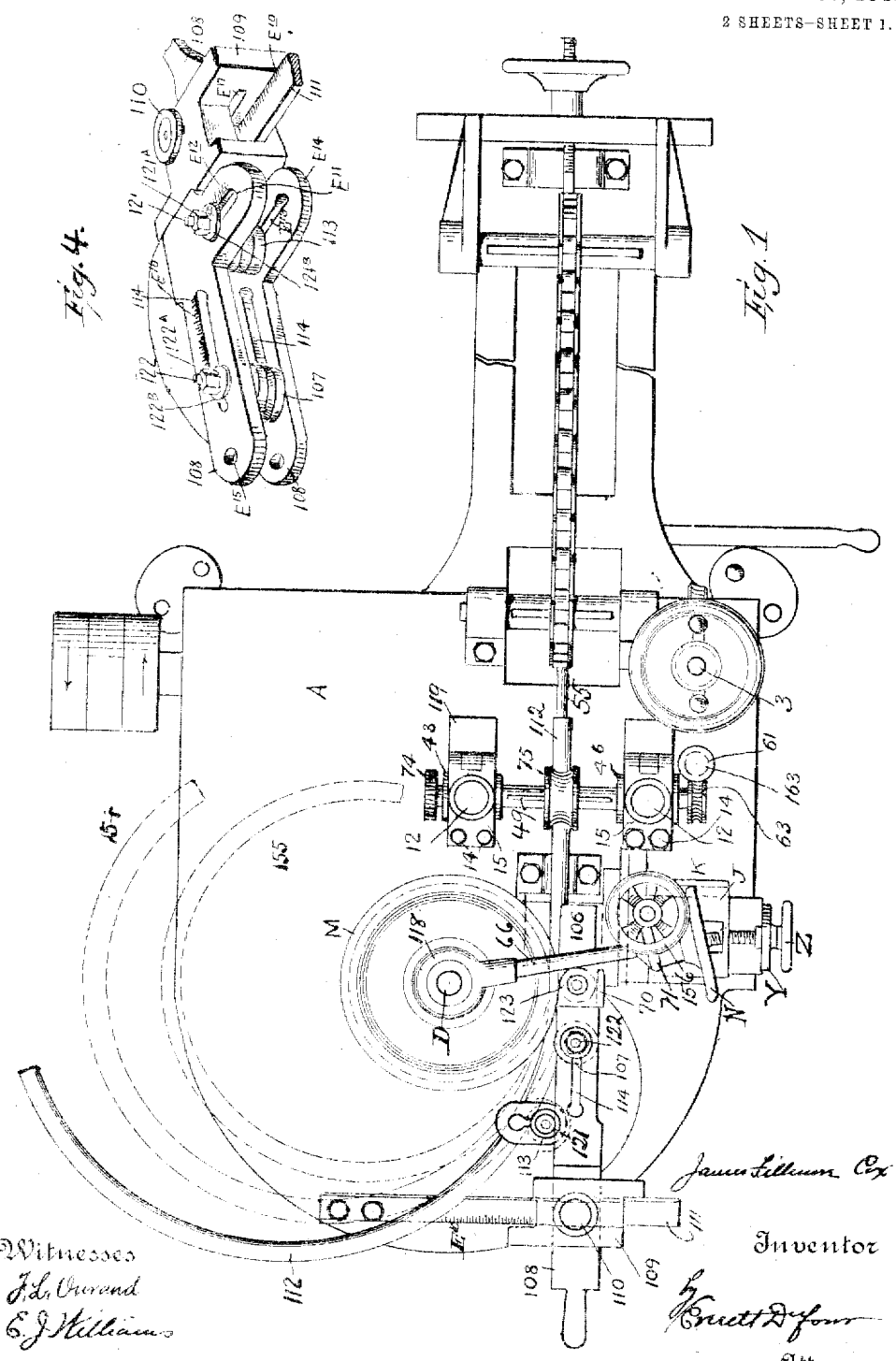

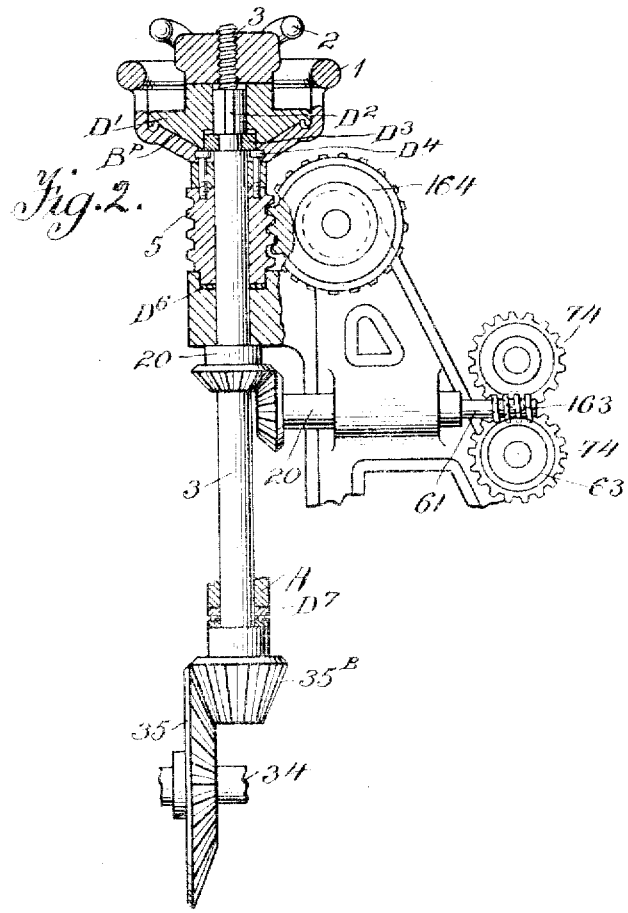
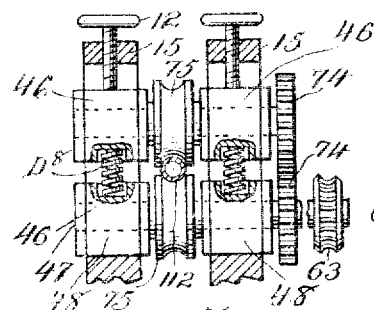

JAMES FILLMORE COX, OF BAYONNE, NEW JERSEY, ASSIGNOR OF ONE-HALF TO MATTHEW T. CRONIN, OF BAYONNE, NEW JERSEY.

BENDING-MACHINE.

1,021,662.     Specification of Letters Patent.     Patented Mar. 26, 1912.

Original application filed June 3, 1909, Serial No. 499,868. Divided and this application filed March 7, 1910. Serial No. 547,723.

*To all whom it may concern:*

Be it known that I, JAMES FILLMORE COX, a citizen of the United States, residing at Bayonne, in the county of Hudson and State of New Jersey, have invented certain new and useful Improvements in Bending-Machines, of which the following is a specification.

My invention relates to improvements in tube or pipe bending machines, more especially for effecting such bending along what may be termed radial lines and which is a division of my application filed June 3, 1909, Serial Number 499,868.

It consists of the combination of parts including their arrangement, as well as their structural features, substantially as hereinafter fully described and defined by the claims.

In the accompanying drawings illustrating the preferred embodiment of my invention—Figure 1 is a plan view of a machine constructed upon the general principles of the machine forming the subject matter of the application above referred to. Fig. 2 is a broken, partly sectional view showing the gearing arrangement of the friction-clutch mechanism, whereby the power is applied or transmitted through a pair of miter gears and a vertical shaft to the endless chain and also by means of a pair of beveled gears in connection with a horizontal shaft, worm and worm-wheel, to the feed-rolls. Fig. 3 is a view in sectional and side elevation, partly fragmentary, of the feed-roller mechanism as also embraced in Fig. 1. Fig. 4 is a detached perspective view of one of the principal features of my invention or what may be termed the bending arm.

In referring to radial bending attention is directed to Fig. 1 by way of illustrating the making of what I term a radial bend which is produced by means of the operative connection of the radial-bending arm 108 with the member 106, which is more clearly shown in Fig. 4. In making this style of bend, the radial bend, the radial-bending arm or attachment 108 is secured to the member 106 as shown in Fig. 1. The forward roller 107 of the member 108 has a corresponding groove in its periphery to accommodate the diameter of tubing which is to be operated upon. The roller 107 is carried by the center 122 which is preferably a steel shaft having suitable bearings in the member 108, which bearings are formed by the openings $E^{15}$ therein, said member also being provided with an additional roller 113 also having suitable bearings therein. Said member 108 has also duplicate right-angled arms $E^{14}$ near one end. Slots or elongated openings 114, $E^{11}$, $E^{13}$ are provided to receive shafts which carry preferably grooved steel rollers 107, 113 arranged between the lateral members of the arm 108, said rollers being suitably held upon said shafts by nuts and washers as indicated at $122^a$, $121^a$, $122^b$, $121^b$. Suitable graduation marks $E^{16}$, $E^{12}$ are suitably produced contiguous to said slots for determining the proper positioning of the said rollers. Also arranged in connection with the bed-plate A, as disclosed by Figs. 1 and 4, is a graduated member 111, its graduations being designated $E^{10}$, for guidance in suitably positioning the radial bending arm 108 in producing a bend of certain radius. The arm 108 has a handle at one end for its suitable manipulation along the graduated member 111, said member 111 passing through a clamping block 109, the arm 108 also extending through said clamping block but at right-angles to the direction of the member 111 and above it. A back rest J is suitably supported in position to have a slidable movement and is adapted to be actuated by a hand-wheel Z, said back-rest carrying the members 70 and 106. A manually actuated locking screw 110 is suitably applied to, or tapped in the clamping block 109. In order to effectively lock the radial bending arm in the member 111 it is only required to suitably actuate the member 110. The central roller which engages the shaft 123 is now advanced until it engages the tubing which is accomplished by suitably operating the hand-wheel Z, actuating the feed-screw which advances the back-rest J carrying the members 106 and 70. In order to make the radial bends, the friction imposed upon the inside half of the pipe or tubing by means of the former M is combined with the friction imposed upon the outer half by means of the roller carried by the shaft 123 as shown in Fig. 1 and which in turn serves to hold the tubing intact with respect to the member M which assures a uniform source of friction at all times.

The rear end of the block 106 is the initial point of resistance and the pipe passes in a straight line into the machine, between the roller borne by shaft 123 and the member M. The machine is then started and subjected to a steady driving action, for imparting a rotation to the member M by means of mechanism not shown herein. The member M continuously rotating, will cause the pipe or tubing, in conjunction with the friction imposed thereon to be drawn forwardly, causing it to pass in contact with the member M and the rollers 107 and 113. When the pipe or tubing reaches the first roll 107 a bending action will begin to be delivered thereon between this point and the center or point at which the friction is imposed, the pipe or tubing passing beyond the roll 107 to, and being engaged by the roll 113 where it will receive the full amount of bending.

I claim—

1. In a machine of the character described, the combination with a grooved former and means for actuating the same, of a guiding contrivance comprising parallel spaced-apart members provided with right-angled outstanding portions, a grooved roller arranged between the latter and a second grooved roller arranged between said members, contiguous to the periphery of the first referred to roller, said grooved former and rollers being adapted to receive between them the object for bending.

2. In a machine of the character described, the combination with a rotary grooved former, of a guiding contrivance comprising parallel spaced-apart members having right-angled outstanding portions, grooved rollers arranged intermediate of said members and said right-angled portions, respectively, said members and arms having slots therein receiving the axles of said rollers, said grooved rollers being arranged contiguous to the periphery of said former.

3. In a machine of the character described the combination, with a rotary grooved former of a guiding contrivance comprising parallel spaced-apart members having right-angled arms, said members and arms having longitudinal slots therein extending in lines perpendicular to each other, rollers having their axles received by and adjustable in said slots, said rollers being arranged contiguous to said grooved former, a bracket whose trend is at right-angles to that of said guiding contrivance, means for the retention of said bracket in effective position, a clamping block engaging said guiding contrivance and bracket.

In testimony whereof I affix my signature in presence of two witnesses.

JAMES FILLMORE COX.

Witnesses:
JOHN J. RYAN,
MATTHEW T. CRONIN.